US012712716B2

(12) United States Patent
Ghosh et al.

(10) Patent No.: US 12,712,716 B2
(45) Date of Patent: Aug. 18, 2026

(54) QUANTUM-BASED DISTRIBUTED LEDGER

(71) Applicant: Bank of America Corporation, Charlotte, NC (US)

(72) Inventors: Ashley Laine Ghosh, McKinney, TX (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 143 days.

(21) Appl. No.: 18/761,076

(22) Filed: Jul. 1, 2024

(65) Prior Publication Data

US 2026/0005841 A1 Jan. 1, 2026

(51) Int. Cl.
*H04L 29/06* (2006.01)
*H04L 9/00* (2022.01)
*H04L 9/08* (2006.01)
*H04L 9/32* (2006.01)

(52) U.S. Cl.
CPC .......... *H04L 9/0852* (2013.01); *H04L 9/3213* (2013.01); *H04L 9/50* (2022.05)

(58) Field of Classification Search
CPC ........ H04L 9/0852; H04L 9/3213; H04L 9/50
See application file for complete search history.

(56) References Cited

U.S. PATENT DOCUMENTS 11,868,846 B1 * 1/2024 Shields .................... G06N 7/01
12,456,079 B2 * 10/2025 Bolt ........................ G06F 9/455
2020/0250607 A1 * 8/2020 Acuna ..................... G06F 3/017
2023/0206329 A1 * 6/2023 Cella .................... G06Q 20/405
2023/0214925 A1 * 7/2023 Cella ...................... G06Q 30/06 705/37
2024/0403462 A1 * 12/2024 Freeman ............. G06F 11/1464
2025/0168007 A1 * 5/2025 Kurian .................. H04L 9/3236

OTHER PUBLICATIONS

Anya Bindra, “Problems That Only Quantum Computers Can Solve,” hello@qmunity.tech, Apr. 29, 2024.
James Page, “What Are The Math Problems in Bitcoin Mining,” Crypto Head Pty Ltd., Mar. 12, 2024.

* cited by examiner

*Primary Examiner* — Mahfuzur Rahman
(74) *Attorney, Agent, or Firm* — Weiss & Arons LLP

(57) ABSTRACT

Apparatus and methods for quantum-computing based distributed ledgers are provided. A distributed ledger program on a computer system with a standard processor and an “N”-qubit processor may receive a request to add data to the distributed ledger from a user. The computer system may then solve one or more algorithmic problems on the “N”-qubit processor. The solution may be received and determined to be correct. When the solution is correct, one or more fungible tokens may be transmitted to the user. When the solution is correct and compensation received from the user, the data may be added to the distributed ledger, and the ledger may be updated across all systems running the ledger.

19 Claims, 7 Drawing Sheets

TOFFOLI GATE $$\begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \\ 0 & 0 & 0 & 0 & 0 & 0 & 1 & 0 \end{pmatrix}$$

| INPUT | | | OUTPUT | | |
|---|---|---|---|---|---|
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 1 |
| 1 | 0 | 0 | 1 | 0 | 0 |
| 1 | 0 | 1 | 1 | 0 | 1 |
| 1 | 1 | 0 | 1 | 1 | 1 |
| 1 | 1 | 1 | 1 | 1 | 0 |

QUANTUM-BASED DISTRIBUTED LEDGER

FIELD OF TECHNOLOGY

Aspects of the disclosure relate to providing apparatus and methods for utilizing quantum computing to access, run, manage, add to, and host distributed ledgers.

BACKGROUND OF THE DISCLOSURE

Distributed ledgers (and associated cryptocurrencies and non-fungible tokens ("NFTs") are utilized worldwide. Distributed ledgers may become more widely used for security, power usage, and immutability reasons, among other reasons.

Current distributed ledgers may work on a "proof-of-work" consensus protocol. These protocols require a computer system to "work" by solving a sophisticated, yet solvable by a standard computer, algorithm. Some distributed ledgers vary the difficulty of the algorithm to regulate the number of solutions achieved during a unit of time (e.g., every week).

These current protocols may have an issue as quantum computing becomes more powerful and widespread. By their nature and utilizing superposition and entanglement, quantum computers may exponentially advance the solution of the current algorithms over standard computers.

Quantum computers may use qubits for processing instead of or in addition to standard microprocessors. Qubits may rely on quantum principles such as entanglement and superposition to perform calculations. Results of measuring qubits may be probabilities or a probability curve. Quantum algorithms may include quantum circuits. Quantum circuits may include qubits formed into various quantum gates.

Quantum computers using qubits may be able to solve the current algorithms much faster and easier than standard computers, Simply making the current algorithms more difficult may not present an issue for quantum computers, as they solve algorithms differently than standard computers.

Therefore, it would be desirable for apparatus and methods for a quantum-based distributed ledger that will allow proof-of-work consensus protocols to be used with quantum computers.

SUMMARY OF THE DISCLOSURE

It is an object of this disclosure to provide apparatus and methods for a quantum-based distributed ledger.

A distributed ledger computer program product is provided. The computer program product may include executable instructions. The executable instructions may be executed by a computer system that includes a standard processor and an "N"-qubit processor. "N" may be any number between two and ten thousand. The computer system may belong to a user.

The instructions may receive a request to add data to a distributed ledger from a user.

The instructions may require the user (i.e., the user's computer) to solve one or more algorithmic problems using the "N"-qubit processor. The one or more algorithmic problems may be unable to be solved by the standard processor.

The instructions may receive a solution to the one or more algorithmic problems.

The instructions may determine that the solution is correct.

The instructions may transmit one or more fungible tokens to the user.

The instructions may receive compensation from the user.

When the solution is correct and compensation is received from the user, the instructions may record the data on the distributed ledger and propagate the data to every computer system running the distributed ledger.

In an embodiment, the one or more algorithmic problems cannot be solved using the standard processor within a pre-determined amount of time.

In an embodiment, the pre-determined time may be one year.

In an embodiment, the pre-determined length of time may be variable.

In an embodiment, the pre-determined length of time may be varied by one or more AI/ML algorithms In an embodiment, the one or more algorithmic problems may be selected from the set of algorithms denoted or defined as "Q-QS". Q may be a universe of algorithmic problems solvable by the "N"-qubit processor. QS may be a subset of Q solvable by the standard processor and the "N"-qubit processor.

In an embodiment, the distributed ledger may be a blockchain.

In an embodiment, the one or more algorithmic problems may be adjusted after an analysis of a length of time the distributed ledger is active.

In an embodiment, the length of time may be one week.

In an embodiment, the analysis may analyze the number of fungible tokens transmitted during the length of time.

In an embodiment, when the analysis determines that too many fungible tokens were transmitted during the length of time, the one or more algorithmic problems may be adjusted to be more computationally difficult to solve.

In an embodiment, the compensation may be a portion of the one or more fungible tokens.

In an embodiment, the compensation may be one of the one or more fungible tokens.

In an embodiment, the one or more fungible tokens may be stored in a digital wallet belonging to the user.

In an embodiment, one of the one or more fungible tokens may be an authentication token.

In an embodiment, only users with one or more authentication tokens may be permitted to add data to the distributed ledger.

In an embodiment, the distributed ledger may be encrypted with a quantum-resistant encryption.

In an embodiment, the quantum-resistant encryption may include one or more of the following: cryptographic suite for algebraic lattices (CRYSTALS)—Dilithium; fast-Fourier lattice-based compact signatures over N-th degree truncated polynomial ring units (NTRU) (FALCON); or a stateless hash-based signature scheme known as SPHINCS+.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
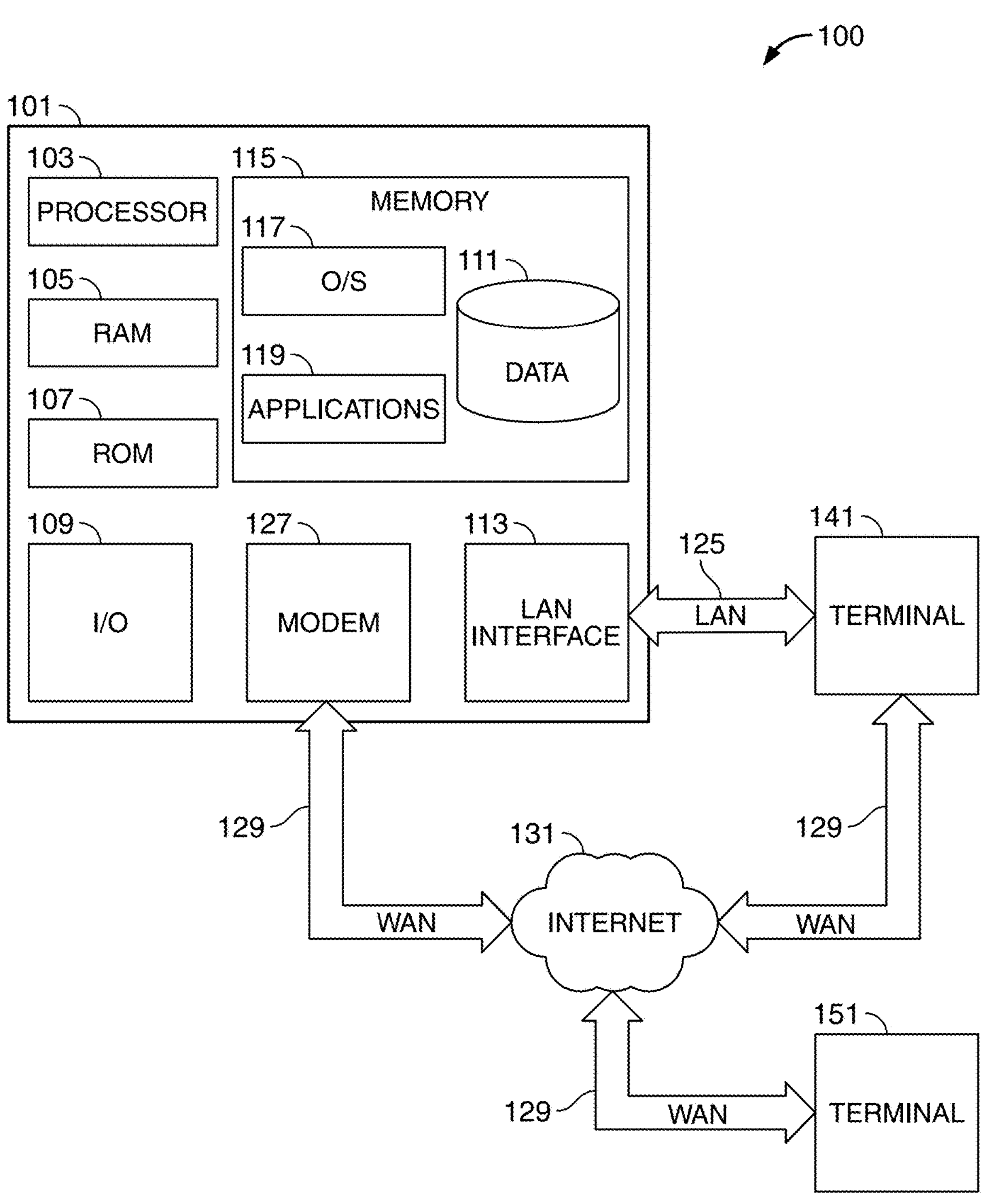
FIG. 1 shows an illustrative apparatus in accordance with principles of the disclosure.

It is an object of this disclosure to provide apparatus and methods for a quantum-based distributed ledger.

A distributed ledger computer program product is provided. The computer program product may include executable instructions. The executable instructions may be executed by a computer system that includes a standard microprocessor and an "N"-qubit processor. "N" may be any number between two and one thousand, or in other embodiments, more than one thousand. A standard microprocessor or standard processor may include all non-quantum computer processors.

References to the "the instructions" may refer to the computer program product.

Quantum computing may be referred to as the use of quantum-mechanical phenomena such as superposition and entanglement to perform computations. The smallest bit in a quantum computer may be called a qubit.

The amount, and type, of calculations that a quantum computer may be able to process may grow exponentially with the number of qubits included in the quantum computer's processing core. A quantum computer with "N" qubits may be able to simultaneously represents $2^n$ states. Therefore, two qubits may hold four states, three qubits may hold eight states, fifty qubits may hold 1, 125, 899, 906, 842, 624 states, and 10,000 qubits may hold $2^{10000}$ states.

Quantum processors are associated with vastly improved efficiencies over classical computers. For example, whereas classical computers represent data in bits, which can be either 0 or 1, quantum processors use qubits which utilize superposition (i.e., the ability to be in multiple states at the same time until it measured) to allow for a state of 0, 1, or any probability of being 0 or 1.

The probabilities can be manipulated using matrix-based quantum gates, which are analogous to classical logic gates. Qubits are therefore able to represent many more data possibilities than a bit-based system of the same size. This may allow for greater speed and less memory usage than classical systems.

A qubit in a state of superposition does not have a defined value because it may hold many potential values at the same time. When measured, the qubit wave function collapses to a defined state. When an entangled qubit is in a state of superposition, each of its entangled connections is also in a state of superposition. These combinations of uncertainties may exponentially increase the power of quantum computers.

The quantum processor may include a default number of quantum threads. Each quantum thread may include a default number of quantum circuits. Quantum circuits, in turn, may refer to hardware and software based computational models that include quantum gates and are used for executing quantum computations.

For example, in some embodiments, at least one of the quantum circuits may include a Toffoli gate. A feature of the Toffoli gate is its universal nature, i.e., it is able to represent classical computer operations as well as quantum operations.

In certain embodiments, at least one of the quantum circuits may include a Hadamard gate. A feature of the Hadamard gate is the ability to represent a superposition state.

Distributed ledger technology may refer to a decentralized, tamperproof, and transactional database. A distributed ledger may provide a distributed, immutable, transparent, secure, and auditable ledger of transactions (i.e., data) or other data. The distributed ledger may provide a secure way to store and process transactions and other data among trusted and untrusted nodes on a network.

The distributed ledger may be a public or un-permissioned distributed ledger. A public distributed ledger may not have restrictions on who may participate in establishing a consensus for adding a new record. For example, records stored in a public distributed ledger may only be added to the ledger when systems that rely on the distributed ledger reach a consensus. The distributed ledger may use any suitable consensus algorithm such as Proof of Work, Proof of Stake or Practical Byzantine Fault Tolerance.

The distributed ledger may be a private or permissioned distributed ledger. A private distributed ledger may include additional restrictions on who may participate in establishing a consensus for adding a new record.

The distributed ledger may utilize a combination of private and public participation to establish a consensus. For example, the distributed ledger may require a threshold number of private and/or public agreements before recording data on the distributed ledger. Utilization of private entities may allow for achieving a consensus (or rejection) of a transaction faster than wholly public distributed ledgers.

The distributed ledger may include a protocol that allows data to be verified by unreliable nodes. The distributed ledger can be consulted openly and fully, allowing access to all recorded data that has been recorded on the ledger since the first recording of the system, and can be verified and collated by any entity at any time. The distributed ledger also stores transactional information in a fashion that prevents alteration of the records stored in the distributed ledger. Therefore, if the ledger states that a particular token belongs to a particular wallet, and the movement of the token can be traced from the moment it first appeared in the ledger, that data may be trusted and may be used for various purposes.

The distributed ledger may store information in linked segments, or a chain of "blocks." The linked blocks may collectively form a "blockchain." Each block may store a set of transactions performed at a given time. Blocks are linked or chained to each other by a reference to the previous block. Each block in the distributed ledger is linked to the previously approved block using a cryptographic hash code of the previous block.

Distributed ledger security may be accomplished by imposing strict rules and mutual agreement among nodes when attempting to add a new block of transactions to the distributed ledger. The strict rules and mutual agreement protocols may be referred to as a consensus mechanism. The consensus mechanism synchronizes the decentralized ledger across all nodes that write to the distributed ledger. The consensus mechanism ensures that all nodes agree on a single authoritative copy of the distributed ledger. Nodes that write to the distributed ledger network may be programmed to recognize the longest chain in a network of nodes as the authoritative source of information for the distributed ledger.

A key component of the consensus mechanism may be proof of work. In one embodiment of a distributed ledger, each node must successfully solve a computationally intensive task before adding a new block to the distributed ledger. The proof of work must be complex to solve and at the same time easily verifiable once completed. This dichotomy ensures that only one node is authorized to add a new block and that all other nodes can easily verify that the new block has been properly linked to a prior block. The computationally intensive nature of the block generation process provides tamperproof and auditable transactional database.

For example, some current distributed edgers require a node to resolve a computationally intensive and difficult (for standard processors) hashing problem. A computer that solves the hashing problem may be rewarded with a token. Once the hashing problem is solved, additional blocks may be added to the distributed ledger. However, these hashing problems may be trivial for a quantum computer to solve.

Alternatively, a more recent paradigm is proof of stake in lieu of proof of work. Proof of stake may be less energy intensive and faster computationally. Other, known and unknown, methods of ensuring a distributed ledger's validity may be used as well as proof of work or proof of stake.

It may be computationally expensive for a malicious attacker to modify a block and attempt to corrupt its contents. The rest of the trusted nodes on the network would continuously generate new blocks, outrunning the attacker in the block generation process. Therefore, a trusted branch of blocks will grow faster than any blocks that can be generated by the attacker. Nodes on a network may be programmed to recognize the longest chain in the network as the authoritative source of information. The nodes on the network may therefore invalidate any shorter chains generated by the attacker.

In order for a manipulated block to be successfully added to the distributed ledger, it would be necessary for the malicious attacker to solve the proof of work faster than the rest of nodes on the network. This may be structured to be computationally too expensive for the attacker. Accomplishing this feat requires having control of at least 51% of the computing resources in the network. However, with the advent of quantum computing, "computationally too expensive' means something different with quantum computers compared to standard computers. The current paradigm may fail in the presence of a quantum computer, as a quantum computer may resolve the work exponentially faster than a standard computer. Therefore, a quantum-based distributed ledger where a quantum computer would not have an advantage would be useful and necessary for the security of distributed ledgers.

A transaction or block may be referred to as a token. A token may also be a representation of data included within a transaction or block. Generally, a token is a unit of data stored on distributed ledger. The token may include unique data. The data may be hashed, creating a unique hash. A token may also represent data or information outside of a transaction or block, as in, for example, cryptocurrencies such as Ethereum or Bitcoin. Tokens may be fungible. Tokens may be non-fungible. Fungible tokens, such as cryptocurrencies, are interchangeable. Non-fungible tokens ("NFTs") may be unique and singular (or in limited quantities) and are non-interchangeable. Distributed ledger technology may be used to provide and verify public proof of ownership of tokens. While all units (copies, or tokens) of a particular cryptocurrency may be mutually interchangeable (and thus fungible), non-fungible tokens are not mutually interchangeable. Currently, distributed ledgers may be used to verify ownership of tokens.

Distributed ledgers may currently use security methods such as public-key cryptography. A public key may be a long, random-looking string of numbers or other intensive data. The public key may function as a computerized address on the ledger, belonging to a particular user. The address may include a computerized wallet that may contain data or information belonging to the user, along with assets belonging to the user. Units of data, such as tokens, sent across the ledger may be recorded as belonging to that address. Along with the public key, a user may have a private key, which may be linked to the public key. A private key may function as a password that gives the user access to her address and wallet and allow the user to interact with the distributed ledger.

However, public-key cryptography and other standard encryption protocols may be susceptible to malicious activity from a quantum-based computer. Stronger ledgers may incorporate quantum-resistant encryption and cryptography.

Distributed ledgers may be centralized or decentralized. In a centralized ledger, a server, or group of servers, may maintain the authoritative copy of the ledger, and any node interacting with the ledger (to view or update) may have to be approved by the server or servers. However, in a decentralized system, every node may have a copy of the ledger and no centralized or official copy of the ledger may exist.

Distributed ledgers/blockchains may be public or private (i.e., conclave or permissioned). Private ledgers may use an access control layer to determine who has access to the ledger to view or add to the ledger.

Distributed ledger smart contracts are code or programs on the ledger that may be partially or fully started, executed, or enforced without human interaction. As long as the parties to a smart contract understand what the smart contract will and will not do, actions taken by the smart contract may be binding on the parties.

Quantum-secure or quantum-resistant encryption methods may also be present in certain embodiments.

The quantum-resistant encryption may include post-quantum cryptography (PQC) that has been chosen for standardization by a standardization authority. The standardization authority may be the National Institute of Standards and Technology (NIST) in the United States. The standardization authority may be the European Union Agency for Cybersecurity (ENISA) in the European Union. The standardization authority in the European Union may include the European Committee for Standardization (CEN), the European Committee for Electrotechnical Standardization (CENELEC), and European Telecommunications Standards Institute (ETSI).

The quantum-resistant encryption may include an algorithm referred to as cryptographic suite for algebraic lattices (CRYSTALS). The quantum-resistant encryption may include an algorithm referred to as IND-CCA2-secure key encapsulation mechanism (KEM) that may be called Kyber. The quantum-resistant encryption may include an algorithm that includes both CRYSTALS and Kyber. This algorithm may be referred to as CRYSTALS-Kyber. CRYSTALS-Kyber may be used for general encryption. CRYSTALS-Kyber includes a public-key encapsulation mechanism (KEM) that may be standardized to provide general encryption. General encryption may include accessing secure websites. CRYSTALS-Kyber may be based on the computational hardness of problems involving structured lattices.

Advantages of CRYSTALS-Kyber may include comparatively small encryption keys compared to other quantum-resistant algorithms. Small encryption keys may facilitate easy exchange between two parties. Another advantage may include its speed of operation.

CRYSTALS-Kyber may be used for digital signatures.

The quantum-resistant encryption may include the CRYSTALS algorithm. The quantum-resistant encryption may include an algorithm referred to as Dilithium. The quantum-resistant encryption may include an algorithm that includes both CRYSTALS and Dilithium. This algorithm may be referred to as CRYSTALS-Dilithium. CRYSTALS-Dilithium may be used for digital signatures. Digital signatures may include digital signatures on electronic documents, purchase of products through the Internet, and the like. CRYSTALS-Dilithium may be based on the computational hardness of problems involving structured lattices.

Advantages of CRYSTALS-Dilithium may include a strongly secure digital signature scheme. Secure may refer to security from chosen message attacks based on the hardness of lattice problems over module lattices. CRYSTALS-Dilithium may include a higher efficiency than other quantum-resistant algorithms.

CRYSTALS-Dilithium may be used for general encryption.

The quantum-resistant encryption may include the fast-fourier lattice-based compact signatures over N-th degree truncated polynomial ring units (NTRU) algorithm. This may also be referred to as the FALCON algorithm. FALCON may be used for digital signatures. Digital signatures may include digital signatures on electronic documents, purchase of products through the Internet, and the like. FALCON may be based on the computational hardness of problems involving structured lattices.

Advantages of FALCON may include a strongly secure digital signature scheme. Security may result from a true Gaussian sampler that may be used internally, that may guarantee negligible leakage of information on the secret key up to a practically infinite number of signatures.

FALCON may also be compact. With the use of NTRU lattices, signatures may be substantially shorter than in any lattice-based signature scheme with the same security guarantees, while the public keys may be around the same size.

FALCON may also operate with speed. The use of fast Fourier sampling may allow for very fast implementations, such as thousands of signatures per second on a common computer, and verification may be five to ten times faster.

FALCON may also be scalable. Operations may have cost O (log n) for degree n, indicating that as input grows, the cost is not highly affected, allowing the use of very long-term security parameters at moderate cost. FALCON may have RAM economy. The enhanced key generation algorithm of Falcon may use less than 30 kilobytes of RAM, that may be a hundredfold improvement over previous designs such as NTRUSign. Falcon may be compatible with small, memory-constrained embedded devices. FALCON may be used for general encryption.

The quantum-resistant encryption may include a stateless hash-based signature scheme known as SPHINCS+. The SPHINCS+ algorithm is read as "Sphincs plus." SPHINCS+ may be used for digital signatures. Digital signatures may include digital signatures on electronic documents, purchase of products through the Internet, and the like.

An advantage of SPHINCS+ includes that it may be an important backup to other quantum-resistant encryptions as it is based on a different math approach than the other lead algorithms. SPHINCS+ operates using hash functions while other lead algorithms may operate with other strategies such as structured lattices. SPHINCS+ may be used for general encryption.

The quantum-resistant encryption may include two or more of the aforementioned, such as CRYSTALS-Dilithium, FALCON, and SPHINCS+.

An additional quantum-resistant encryption may include Bit Flipping Key Encapsulation (BIKE). An additional quantum-resistant encryption may include Classic McEliece. An additional quantum-resistant encryption may include Hamming Quasi-Cyclic (HQC). An additional quantum-resistant encryption may include Supersingular Isogeny Diffie-Hellman (SIKE).

Other standard components of a computer system may be present, such as communication links, displays, input and output devices, read-only and random-access memory, and other components.

The term "non-transitory memory," as used in this disclosure, is a limitation of the medium itself, i.e., it is a tangible medium and not a signal, as opposed to a limitation on data storage types (e.g., RAM VS. ROM). "Non-transitory memory" may include both RAM and ROM, as well as other types of memory.

The non-transitory memory may be configured to store executable data configured to run on the "N"-qubit processor and/or the standard processor.

The "N"-qubit processor and/or standard processors may control the operation of the computer system and its components, which may include RAM, ROM, an input/output module, and other memory. Other components commonly used for computers, such as EEPROM or Flash memory or any other suitable components, may also be part of the apparatus and computer system.

A communication link may enable communication with other computers and servers, as well as enable the program to communicate with databases. The communication link may include any necessary hardware (e.g., antennae) and software to control the link. Any appropriate communication link may be used, such as Wi-Fi, bluetooth, LAN, and cellular links. Multiple communication links may be present. In an embodiment, the network used to communicate may be the Internet. In another embodiment, the network may be an internal intranet or other internal network.

The instructions may receive a request to add data to a distributed ledger from a user. The request may be received over a network, such as the Internet. The request may be input directly into the computer system. The request may include digital data, metadata, and other information. The data may be anything appropriate to store on the distributed ledger.

The instructions may then solve one or more algorithmic problems using the "N"-qubit processor. The algorithmic problems should be computationally difficult, as well as unable to typically be solved in the mind. The one or more algorithmic problems may be unable to be solved by the standard processor. One example of a computationally difficult problem that is unable to be solved in the mind or by a standard processor may be the 'forrelation' problem. A forrelation problem may refer to determining whether two random number generators are linked, such as, e.g., one is the Fourier transform of another.

In other embodiments, a computationally difficult problem that is unable to be solved in the mind or by a standard processor (i.e., "one or more algorithmic problems [that] cannot be solved using the" standard or micro-processor) may refer to a problem that can technically be solved by a standard processor, but not in any useable timeframe. For example, some problems may be solved by a standard processor but may take years, or hundreds of years at current computing processing speeds. These problems may not effectively be solved by standard processors.

In an embodiment, the instructions may initialize a quantum circuit with the "N"-qubit processor to solve the one or more algorithmic problems. A quantum circuit may include qubits and quantum gates and may be configured to receive data, problems (or problem sets) and produce an output. A group of qubits may be referred to as a quantum register. The quantum gates may perform operations that manipulate quantum state(s) of the qubits. These operations may be used to solve the one or more algorithmic problems.

The program may utilize a superposition property of the "N"-qubit processor to solve the one or more algorithmic problems. As superposition may include infinite probabilities of a qubit being between 0 and 1, or 0 and 1, these probabilities may allow for the solution of algorithmic problems that cannot be realistically solved by a standard computer.

In an embodiment, the quantum circuit may include one or more Toffoli or Hadamard gates. Other quantum logic gates may be used as well.

The instructions may receive or find a solution to the one or more algorithmic problems using the "N"-qubit processor.

The instructions may determine that the solution is correct. Any of the one or more algorithmic problems that are used by the program should have an answer. The answer may be presented as probabilities, integers, hash values, or otherwise. In an embodiment, the instructions may assume that the solution is correct.

The instructions may transmit one or more fungible tokens to the user. Transmission may include transferring the one or more fungible tokens to a digital wallet belonging to the user. Transmission may include transmitting within the same computer system, from memory to memory.

In an embodiment, the one or more fungible tokens may be transferred by the user to another user or elsewhere.

The instructions may receive compensation from the user. Compensation may include payment. Compensation may include monetary payment. Compensation may include all or a portion of one or more fungible tokens. Compensation may be used to regulate the addition of information to the distributed ledger.

In an embodiment, compensation may be converted to monetary payment.

Recording the data on the ledger may require two conditions to be met, namely: that the solution is correct, and that compensation is received from the user. When these two conditions are met, the instructions may record the data on the distributed ledger and propagate the data to every computer system running the distributed ledger.

In an embodiment, the one or more algorithmic problems cannot be solved using the standard processor within a pre-determined amount of time. For example, the one or more algorithmic problems may be solved by the standard processor but solving it may take an inordinate amount of time. The length of time that is inordinate may vary depending on multiple factors, such as the capabilities of standard processors.

In an embodiment, the pre-determined time may be one year. If a standard processor takes a year or longer to solve an algorithmic problem, but the quantum processor can solve the problem faster, that algorithmic problem may be used by the program.

In an embodiment, the pre-determined length of time may be variable. For example, if standard processors become more powerful, the time to solve a particular problem may be reduced. To prevent a standard processor from adding to the ledger, the amount of time considered long may also be reduced. It may be variable at any point where the distributed ledger is active.

In an embodiment, the pre-determined length of time may be varied by one or more AI/ML algorithms.

In an embodiment, the instructions may use one or more artificial intelligence/machine learning ("AI/ML") algorithms to determine what one or more algorithmic problems to solve. Any suitable AI/ML algorithm may be used. The AI/ML algorithm may use the following factors, among others: the difficulty of the problem for a standard processor, the difficulty of the problem for a quantum processor, whether the addition of data to the distributed ledger needs to be sped up or slowed down, and how long it is anticipated that the quantum processor will take to solve the one or more problems.

In an embodiment, multiple problems may be used to lengthen the amount of time it may take the quantum processor to solve the set of problems.

In an embodiment, the pre-determined length of time may be varied by a system administrator. The system administrator may be chosen by a majority of users of the distributed ledger. The system administrator may be chosen through a different method.

In an embodiment, the one or more algorithmic problems may be selected from the set of algorithms denoted "Q-QS". Q may be a universe of algorithmic problems solvable by the "N"-qubit processor. QS may be a subset of Q solvable by both the standard processor and the "N"-qubit processor.

In an embodiment, QS may be a subset of Q solvable by both the standard processor within a feasible length of time and the "N"-qubit processor. Problems that may be solved by the standard processor in an inordinate/infeasible length of time may be outside of QS.

In an embodiment, the distributed ledger may be a blockchain. As explained supra, blockchains may be a particular type of distributed ledger, with certain advantages and disadvantages.

In an embodiment, the one or more algorithmic problems may be adjusted after an analysis of a length of time the distributed ledger is active. For example, the instructions may analyze the activity of the distributed ledger for the past week, two weeks, one month, etc. If the instructions determine that too much data is being added to the ledger within that timeframe, the instructions may adjust the one or more algorithmic problems to make them more difficult (i.e., take longer) for a quantum processor to solve. If the instructions determine that too little data is being added to the ledger within that timeframe (i.e., the one or more problems may be too difficult to solve), the instructions may adjust the one or more algorithmic problems to make them easier (i.e., take less time) to solve.

This process of adjustment may be dynamic. This process of adjustment may be performed by one or more AI/ML algorithms.

In an embodiment, the analysis may analyze the number of fungible tokens transmitted during the length of time. This may be a proxy for the number of problems solved during the length of time. Other proxies for the number of problems solved, as well as a determination on how long each solution took to resolve, may be used by the instructions to determine if, when, and how an adjustment may be needed.

In an embodiment, when the analysis determines that too many fungible tokens were transmitted during the length of time, the one or more algorithmic problems may be adjusted to be more computationally difficult to solve. That is, the one or more algorithmic problems may be adjusted so that they take (on average) longer to solve, slowing down the addition of data to the distributed ledger.

In an embodiment, the compensation may be a portion of the one or more fungible tokens. In an embodiment, the compensation may be one of the one or more fungible tokens. The user, or the instructions, may transfer the compensation from a digital wallet to: the distributed ledger, an administrative wallet, a separate wallet, or elsewhere. In an embodiment, the compensation may be destroyed after it is transferred as compensation. Destroying the compensation may regulate the number of fungible tokens in circulation.

In an embodiment, the one or more fungible tokens may be stored in a digital wallet belonging to the user.

In an embodiment, one of the one or more fungible tokens may be an authentication token. An authentication token may be a token generated after the user logs in to and is authenticated by the program, the digital wallet, the distributed ledger, or elsewhere. Authentication tokens may be used to prove that the user is the correct user, or authorized to act on behalf of the user.

In an embodiment, only users with one or more authentication tokens, in addition to the methods discussed in the disclosure, may be permitted to add data to the distributed ledger. Authentication, as proven by an authentication token, may be used to ensure the security of the distributed ledger.

In an embodiment, the distributed ledger may be encrypted with a quantum-resistant encryption. The quantum-resistant encryption may be in lieu of, or in addition to, standard encryption.

In an embodiment, the quantum-resistant encryption may include one or more of the following: cryptographic suite for algebraic lattices (CRYSTALS)—Dilithium; fast-Fourier lattice-based compact signatures over N-th degree truncated polynomial ring units (NTRU) (FALCON); or a stateless hash-based signature scheme known as SPHINCS+. Other quantum-resistant encryption methods may also be used.

In an embodiment, a distributed ledger may include two tracks of data. One track may be a standard, existing distributed ledger that requires proof of work from a standard processor. The second track may incorporate this disclosure and require proof of work from a quantum processor. Both tracks of data may coexist on one ledger, but the tracks should be prevented from mixing. This may ensure the security and integrity of both tracks of data.

An apparatus for a distributed ledger using quantum computing is provided. The apparatus may include two or more computer systems. Each computer system may include a communication link, a micro-processor, an "N"-qubit processor and a non-transitory memory.

The non-transitory memory may be configured to store at least, an operating system, and a distributed ledger application.

The distributed ledger application may receive a request to add data to a distributed ledger from a user. The distributed ledger application may require the user to solve one or more algorithmic problems using the "N"-qubit processor. The distributed ledger application may receive a solution to the one or more algorithmic problems. The distributed ledger application may determine that the solution is correct. The distributed ledger application may transmit one or more fungible tokens to the user. The distributed ledger application may receive compensation from the user.

When the solution is correct and compensation is received from the user, the distributed ledger application may record the data on the distributed ledger and propagate the data to every computer system running the distributed ledger The one or more algorithmic problems cannot be solved using the standard processor and "N" is a number between two and one thousand.

A method for a quantum-based distributed ledger is provided. The method may include the step of receiving, at a distributed ledger computer program running on a computer system that includes a standard processor and an "N"-qubit processor, a request to add data to a distributed ledger from a user. "N" may be a number between two and one thousand The method may include the step of solving one or more algorithmic problems from the set of Q-QS using the "N"-qubit processor. Q may be is a universe of algorithmic problems solvable by the "N"-qubit processor. QS may be a subset of Q solvable by the standard processor and the "N"-qubit processor The method may include the step of receiving a solution to the one or more algorithmic problems.

The method may include the step of determining that the solution is correct.

The method may include the step of transmitting one or more fungible tokens to the user.

The method may include the step of receiving compensation from the user.

When the solution is correct and compensation is received from the user, the method may include the steps of recording the data on the distributed ledger and propagating the data to every computer system running the distributed ledger.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer or computer system 101. Computer 101 may alternatively be referred to herein as a "computing device" or "computing system". Computer 101 may be a quantum computer or part of a quantum computer. Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more "N"-qubit processors as well as standard microprocessors 103 for controlling the operation of the device and its associated components, and may include RAM 105, ROM 107, input/output module 109, and a memory 115. The processors 103 may also execute all software running on the computer 101—e.g., the operating system 117 and applications 119 such as a distributed ledger program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a distributed ledger program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as a distributed ledger program and security protocols) along with any data needed for the operation of the apparatus. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the processor or processors 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". These remote computers and servers, terminals 141 and 151 (as well as other terminals, not shown) may be other quantum computers. References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be other quantum computers or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for a distributed ledger program and security protocols, as well as other programs. In an embodiment, one or more programs, or aspects of a program, may use one or more distributed ledger and AI/ML algorithm(s). The various tasks may be related to authenticating a user with a quantum computer.

Computer 101 may also include various other components, such as a battery (not shown), speaker (not shown), a network interface controller (not shown), and/or antennas (not shown).

Any information described above in connection with data 111, and any other suitable information, may be stored in memory 115. One or more of applications 119 may include one or more algorithmic problems that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, multiprocessor systems, microprocessor-based systems, set top boxes, programmable consumer electronics, network PCs, minicomputers, mainframe computers, distributed computing environments that include any of the above systems or devices, quantum computers and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
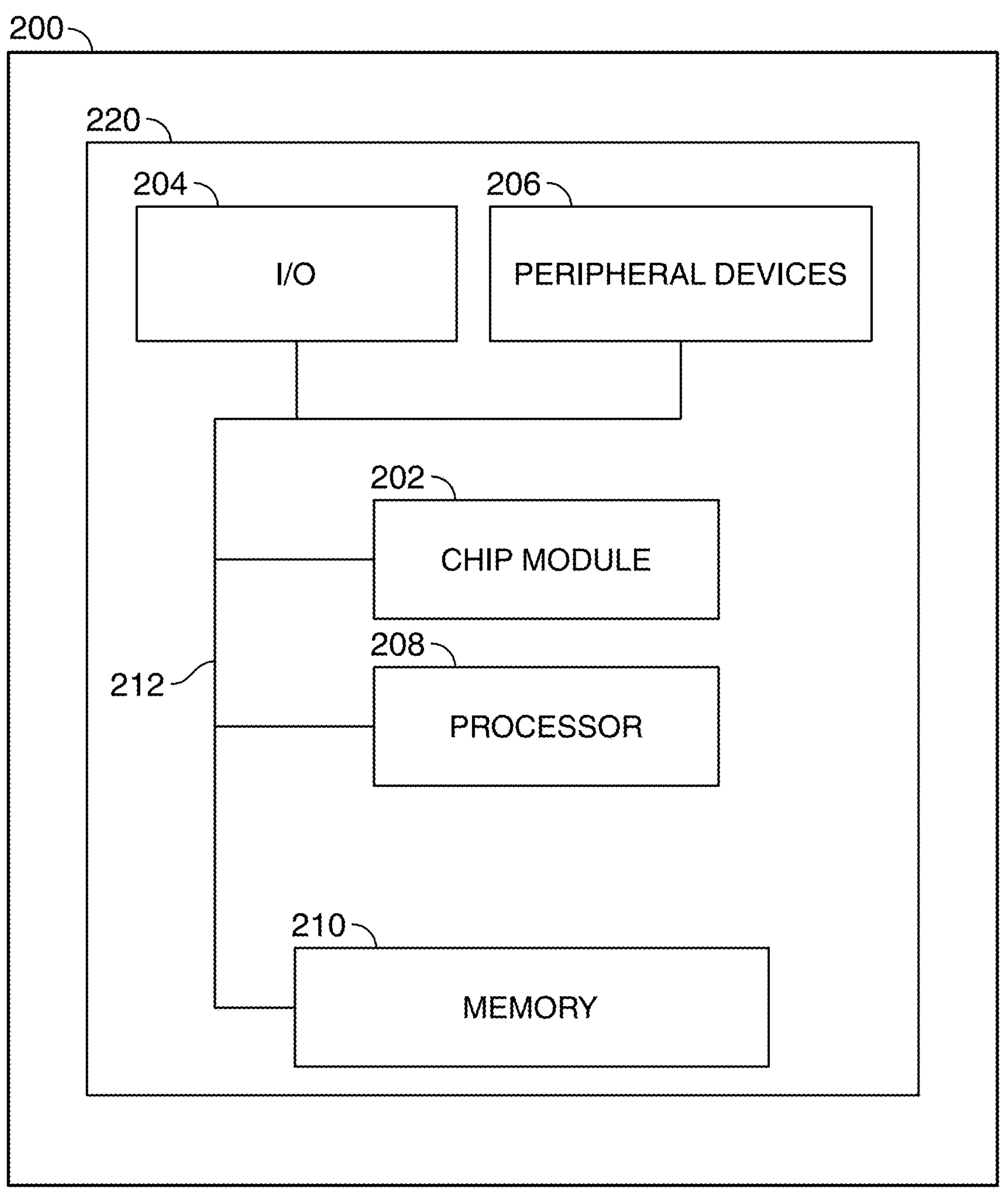
FIG. 2 shows an illustrative apparatus in accordance with principles of the disclosure.

FIG. 2 shows illustrative apparatus 200 that may be configured in accordance with the principles of the disclosure. Apparatus 200 may be a quantum computer, a server, or computer with various peripheral devices 206. Apparatus 200 may include one or more features of the apparatus shown in FIGS. 1-6. Apparatus 200 may include chip module 202, which may include one or more quantum and integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may be quantum based and may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based. The chip may be quantum-based.

Figure 3:
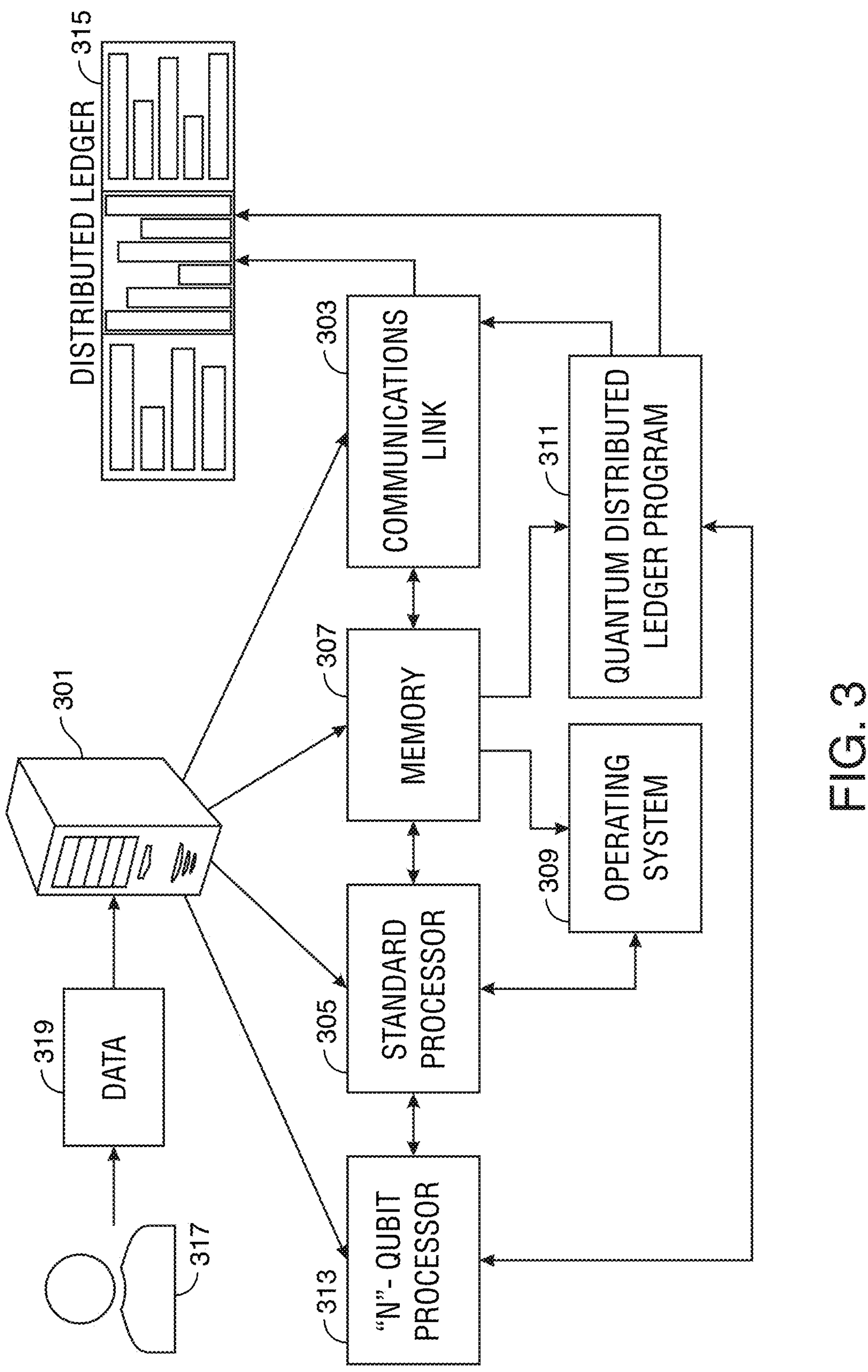
FIG. 3 shows an illustrative apparatus in accordance with principles of the disclosure.

FIG. 3 shows an illustrative apparatus schematic in accordance with principles of the disclosure. The apparatus may include two or more computer systems 301 and a distributed ledger 315. A user 317 may send a request to add data 319 to the distributed ledger 315 to one of the computer systems 301.

Each computer system 301 may include a communications link 303, a standard processor/processors 305, a non-transitory memory 307, a "N"-qubit quantum processor 313, as well as other components, such as a graphical user interface.

The non-transitory memory 307 may include an operating system 309, as well as a copy of a quantum-based distributed ledger application 311, as well as other data and programs.

The communications link 303 may communicate with other computer systems and the distributed ledger 315, as well as the user 317. User 317 may be remote from computer system 301 and may be communicating through a separate computer system (not shown).

Portions of the distributed ledger application 311 may run on both the standard processor 305 and the quantum processor 313. For example, a user interface module and a communications module may run on the standard processor.

The distributed ledger application 311 may receive data 319 from the user 317. The user 317 may desire to add the data 319 to the distributed ledger.

The distributed ledger application 311 may perform work on the "N"-qubit processor 313 that cannot be performed efficiently on the standard processor 305. This "proof-of-work" may then be used to add the data 319 to the distributed ledger 315 through various distributed ledger protocols.

The distributed ledger application 311 may initialize a quantum circuit with the "N"-qubit processor 313.

The distributed ledger application 311 may solve one or more algorithmic problems through the "N"-qubit processor 313.

When the one or more algorithmic problems are solved, the distributed ledger application 311 may collapse the quantum circuit.

Figure 4:
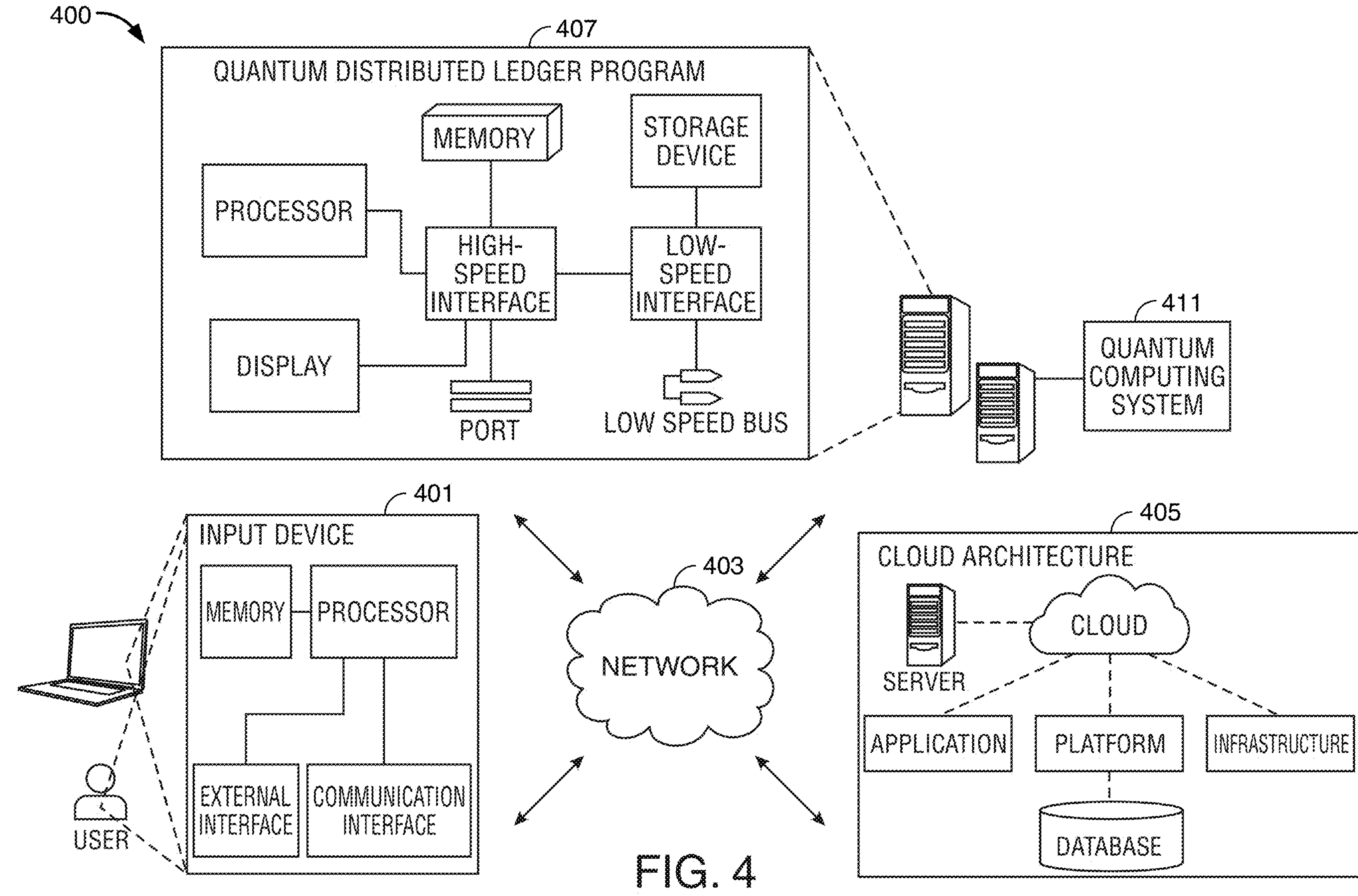
FIG. 4 shows an illustrative diagram in accordance with principles of the disclosure.

FIG. 4 shows illustrative diagram 400 in accordance with principles of the disclosure. Diagram 400 includes input device 401, cloud architecture 405, and distributed ledger program 407, some or all of which may be in communication with each other via architecture network 403.

Input device 401 may include a memory, standard processor, "N"-qubit processor, external interface, and communication interface. Cloud architecture 405 may include various servers, applications, platforms, infrastructures, and databases. Cloud architecture 405 and/or input device 401 may include the quantum computing system 411.

Distributed ledger program 407 may run on a quantum computing system 411 that includes both an N-qubit quantum processor and a standard micro-processor, a display, memory, high- and low-speed interfaces, connection ports, and suitable memory devices and communication busses. The program 407 may allow for a quantum-based distributed ledger and perform various computing tasks according to the methods and configurations disclosed herein.

Figure 5A:
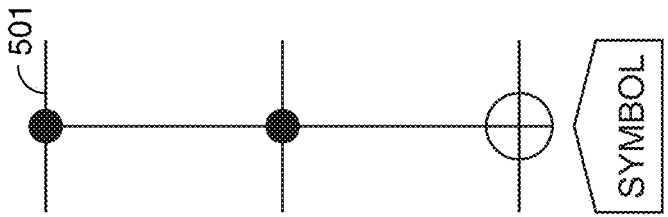
FIG. 5A shows an illustrative logic gate in accordance with principles of the disclosure.
Figure 5A:
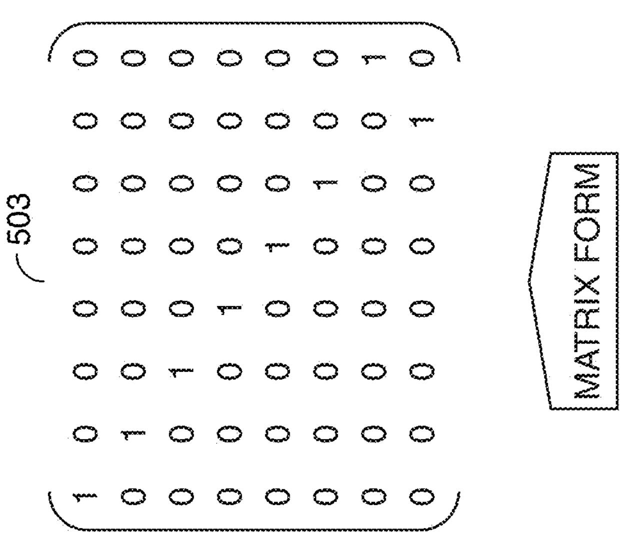
Figure 5A:
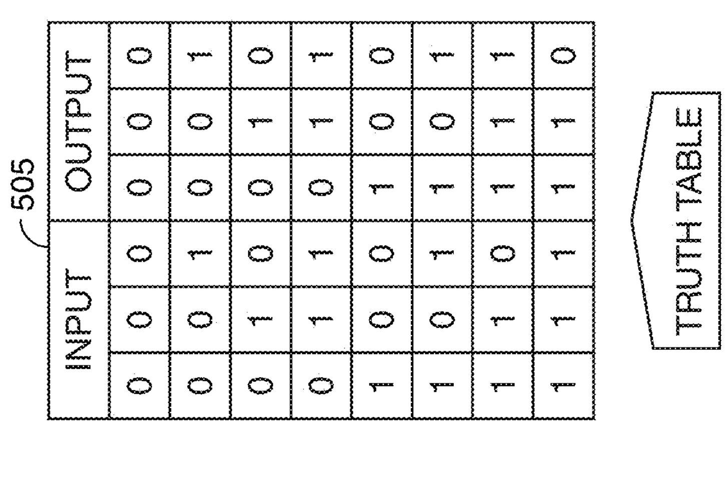
Figure 5B:
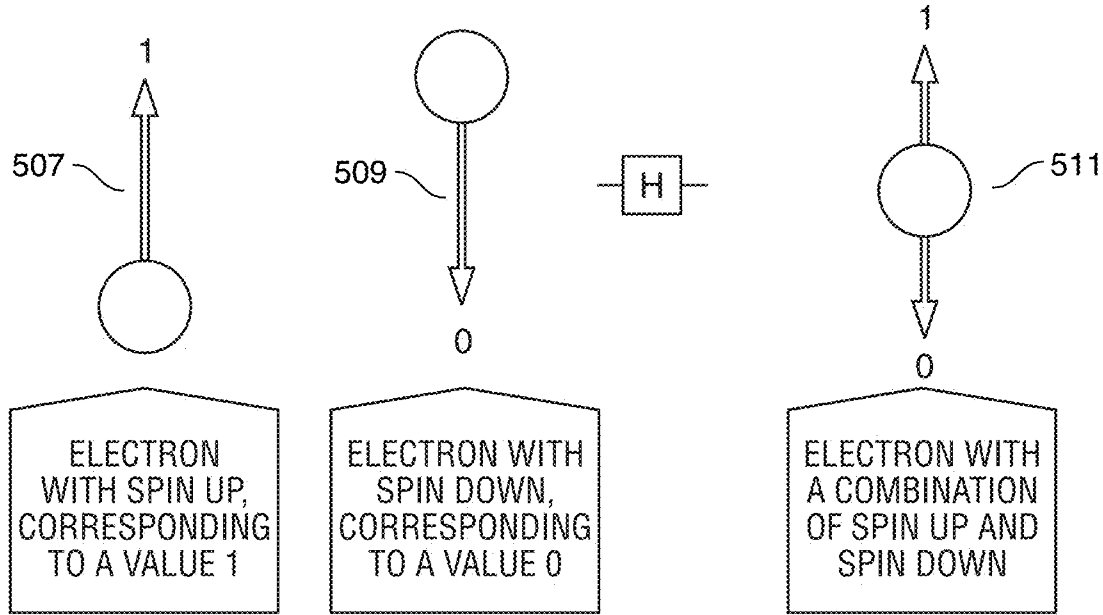
FIG. 5B shows an illustrative logic gate in accordance with principles of the disclosure.

FIGS. 5A-5B show illustrative diagrams of exemplary quantum gates in accordance with principles of the disclosure. FIG. 5A shows symbol 501, matrix form 503, and truth table 505 of a Toffoli gate. A Toffoli gate is a universal reversible logic gate, which means that it enables simulation of any classical reversible circuit. In operation, as seen in truth table 505, the exemplary Toffoli gate has a 3-bit input and a 3-bit output. The first two output bits always mirror the first two input bits. The third bit also stays the same unless the first two input bits are both set to 1-in which case the third output bit is inverted from the third input bit. The Toffoli gate is therefore also known as the "controlled-controlled-not" gate.

FIG. 5B shows representations of a Hadamard gate. Symbol 507 shows a representation of electron spin up, which corresponds to the value 1. Symbol 509 shows a representation of electron spin down, which corresponds to the value 0. Symbol 511 shows a representation of electron spin up and down, which corresponds to the value that represents a superposition of 1 and 0.

Figure 6:
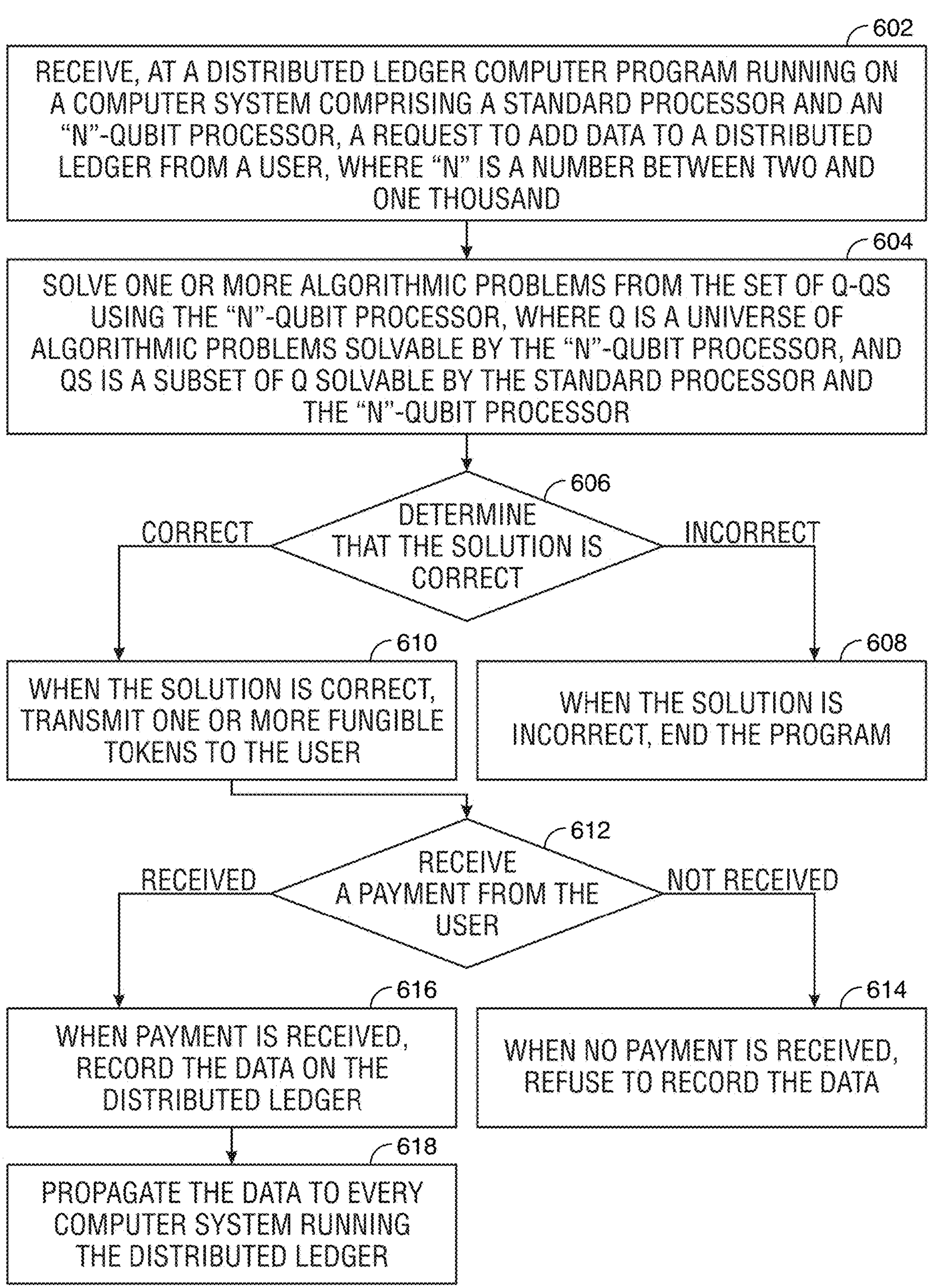
FIG. 6 shows an illustrative flowchart in accordance with principles of the disclosure.

FIG. 6 shows an illustrative flowchart in accordance with principles of the disclosure. Methods may include some or all of the method steps numbered 602 through 618. Methods may include the steps illustrated in FIG. 6 in an order different from the illustrated order. The illustrative method shown in FIG. 6 may include one or more steps performed in other figures or described herein. Steps 602 through 618 may be performed on the apparatus shown in FIGS. 1-5, or other apparatus.

At step 602, a distributed ledger application or computer program on a computer system that includes both a microprocessor (or standard processor) and an "N"-qubit processor, may receive a request to add data to a distributed ledger from a user. A copy of the distributed ledger, or a portion of the distributed ledger, may be present on the computer system. "N" may be a number between two and one thousand.

At step 604, the program may solve one or more algorithmic problems from the subset of Q-QS using the "N"-qubit processor. Q may be a universe of algorithmic problems solvable by the "N"-qubit processor. QS may be a subset of Q solvable by the standard processor and the "N"-qubit processor.

The program may receive a solution to the one or more algorithmic problems.

At step 606, the program may determine whether the solution is correct or not.

If the solution is incorrect, at step 608, the program may terminate.

When the solution is correct, at step 610, the program may transmit one or more fungible tokens to the user, or the user's digital wallet.

At step 612, the program may determine whether or not compensation was received from the user.

If no compensation was received, at step 614, the program may refuse to record the data. In an embodiment, the program may prompt the user for compensation.

At step 616, when the solution is correct and compensation is received from the user, the program may record the data on the distributed ledger.

At step 618, when data is recorded on the distributed ledger, the program may propagate the data to every computer system running the distributed ledger.

Thus, apparatus and methods for a quantum-computing based distributed ledger are provided. Persons skilled in the art will appreciate that the present invention can be practiced by other than the described embodiments, which are presented for purposes of illustration rather than of limitation.

What is claimed is:

1. A distributed ledger computer program product, the computer program product comprising executable instructions stored on non-transitory memory of a computer system that comprises a standard processor and an "N"-qubit processor, the executable instructions when executed by the computer system:

- receive a request to add data to a distributed ledger from a user;
- solve one or more algorithmic problems using the "N"-qubit processor;
- receive a solution to the one or more algorithmic problems;
- determine that the solution is correct;
- transmit one or more fungible tokens to the user;
- receive compensation from the user;
- when the solution is correct and compensation is received from the user, record the data on the distributed ledger; and
- propagate the data to every computer system running the distributed ledger;

wherein:

- the one or more algorithmic problems cannot be solved using the standard processor;
- the one or more algorithmic problems are selected from a set of algorithmic problems defined as Q-QS;
  wherein:
  - Q is a universe of algorithmic problems solvable by the "N"-qubit processor; and
  - QS is a subset of Q solvable by the standard processor and the "N"-qubit processor; and
- "N" is a number between two and one thousand.

2. The distributed ledger computer program product of claim 1 wherein the one or more algorithmic problems cannot be solved using the standard processor within a pre-determined length of time.

3. The distributed ledger computer program product of claim 2 wherein the pre-determined time is one year.

4. The distributed ledger computer program product of claim 2 wherein the pre-determined length of time is variable.

5. The distributed ledger computer program product of claim 1 wherein the distributed ledger is a blockchain.

6. The distributed ledger computer program product of claim 4 wherein the pre-determined length of time is varied by one or more AI/ML algorithms.

7. The distributed ledger computer program product of claim 1 wherein the one or more algorithmic problems are adjusted after an analysis of a length of time the distributed ledger is active.

8. The distributed ledger computer program product of claim 7 wherein the length of time is one week.

9. The distributed ledger computer program product of claim 7 wherein the analysis analyzes the number of fungible tokens transmitted during the length of time.

10. The distributed ledger computer program product of claim 9 wherein when the analysis determines that too many fungible tokens were transmitted, the one or more algorithmic problems are made more difficult to solve.

11. The distributed ledger computer program product of claim 1 wherein the compensation is a portion of the one or more fungible tokens.

12. The distributed ledger computer program product of claim 1 wherein the compensation is one of the one or more fungible tokens.

13. The distributed ledger computer program product of claim 1 wherein the one or more fungible tokens are stored in a digital wallet belonging to the user.

14. The distributed ledger computer program product of claim 1 wherein one of the one or more fungible tokens is an authentication token.

15. The distributed ledger computer program product of claim 14 wherein only users with one or more authentication tokens are permitted to add data to the distributed ledger.

16. The distributed ledger computer program product of claim 1 wherein the distributed ledger is encrypted with a quantum-resistant encryption.

17. The distributed ledger computer program product of claim 16 wherein the quantum-resistant encryption comprises one or more of the following:

- cryptographic suite for algebraic lattices (CRYSTALS)-Dilithium;
- fast-Fourier lattice-based compact signatures over N-th degree truncated polynomial ring units (NTRU) (FALCON); or a stateless hash-based signature scheme known as SPHINCS+.

18. An apparatus for a distributed ledger using quantum computing, the apparatus comprising:

two or more computer systems, each computer system comprising:

a communication link;

a micro-processor;

an "N"-qubit processor; and a non-transitory memory configured to store at least:

an operating system; and a distributed ledger application;

wherein the distributed ledger application:

receives a request to add data to a distributed ledger from a user;

requires the user to solve one or more algorithmic problems using the "N"-qubit processor;

receives a solution to the one or more algorithmic problems;

determines that the solution is correct;

transmits one or more fungible tokens to the user;

receives compensation from the user;

when the solution is correct and compensation is received from the user, records the data on the distributed ledger; and propagates the data to every computer system running the distributed ledger; and wherein:

the one or more algorithmic problems cannot be solved using the micro-processor;

the one or more algorithmic problems are selected from a set of algorithmic problems defined as Q-QS; wherein:

Q is a universe of algorithmic problems solvable by the "N"-qubit processor; and QS is a subset of Q solvable by the standard processor and the "N"-qubit processor; and "N" is a number between two and one thousand.

19. A method for quantum-based distributed ledger, the method comprising the steps of:

receiving, at a distributed ledger computer program running on a computer system comprising a standard processor and an "N"-qubit processor, a request to add data to a distributed ledger from a user;

solving one or more algorithmic problems from a set of algorithmic problems defined as Q-QS using the "N"-qubit processor;

receiving a solution to the one or more algorithmic problems;

determining that the solution is correct;

when the solution is correct, transmitting one or more fungible tokens to the user;

receiving compensation from the user; and when the solution is correct and compensation is received from the user:

recording the data on the distributed ledger; and propagating the data to every computer system running the distributed ledger;

wherein:

Q is a universe of algorithmic problems solvable by the "N"-qubit processor;

QS is a subset of Q solvable by the standard processor and the "N"-qubit processor; and "N" is a number between two and one thousand.

* * * * *